(No Model.)
N. TALARD.
Apparatus for Emptying and Removing the Contents of Cess Pools.
No. 241,751. Patented May 17, 1881.
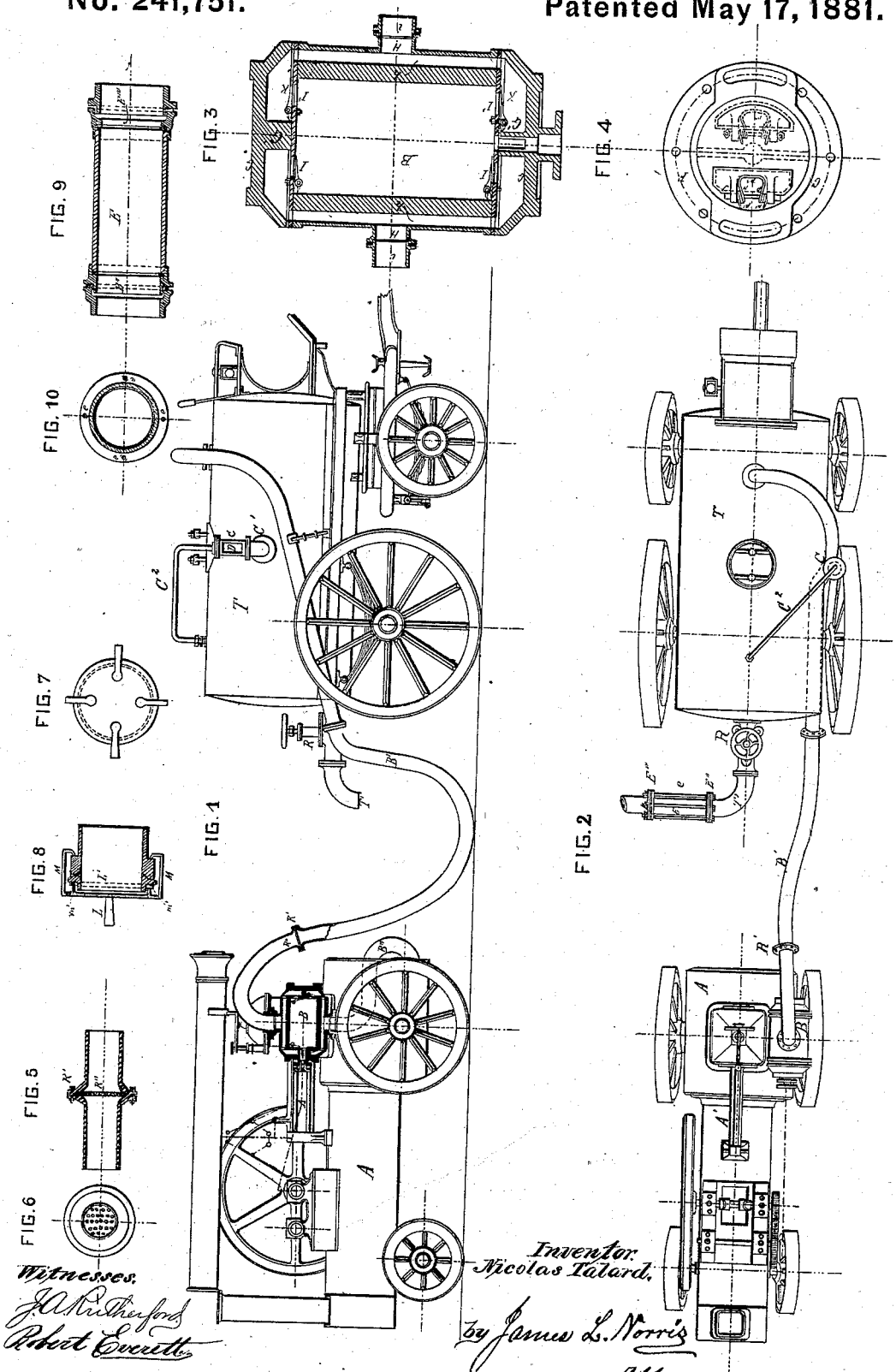
Inventor.
Nicolas Talard,
by James L. Norris
Atty
Witnesses.
J. A. Rutherford
Robert Everett

UNITED STATES PATENT OFFICE.

NICOLAS TALARD, OF PARIS, FRANCE.

APPARATUS FOR EMPTYING AND REMOVING THE CONTENTS OF CESSPOOLS.

SPECIFICATION forming part of Letters Patent No. 241,751, dated May 17, 1881.

Application filed February 23, 1881. (No model.) Patented in France December 30, 1876, and in Great Britain December 7, 1880.

*To all whom it may concern:*

Be it known that I, NICOLAS TALARD, a citizen of France, residing at Paris, in the Republic of France, have invented a new and useful Improved Apparatus for Removing the Contents of Cesspools and Privies, (for which I have obtained a patent in Great Britain, No. 5,103, bearing date December 7, 1880, and in France, bearing date December 30, 1876,) of which the following is a specification.

My invention relates to improved apparatus for emptying and conveying away the contents of cesspools and privies, whereby such contents are first drawn from the cesspools into recipients by suction, and are then conveyed away to be discharged where convenient.

The construction of the said apparatus will be understood on reference to the accompanying drawings, in which—

Figure 1 shows a front elevation, and Fig. 2 a plan, of the combined pumping-engine and recipient. Figs. 3 to 10 show detached details to an enlarged scale.

On the portable engine A is fixed an air-pump, B, the piston of which (omitted in the drawings) is worked either directly or by gearing, as shown, from the engine-cylinder A'. The pump is double-acting, and its suction pipe or hose B' communicates with the top of the recipient T, the bottom of which communicates by means of the pipe or hose T' with the cesspool to be emptied, so that by exhausting the air from the recipient T by means of the air-pump the contents of the cesspool are forced by atmospheric pressure up through the pipe T' into the recipient. The suction-pipe B' being made to communicate with the top of the recipient, this can become entirely filled with the sewage matter without interfering with the action of the pump; and in order to prevent the sewage matter from passing into pipe B', and thence into the pump when T is full, there is provided at the side of the latter a gage, consisting of a glass cylinder, D, partly inclosed in a casing, C, the lower end of which communicates by a branch, C', of large diameter with the side of the recipient, so that the contents of the latter can freely enter D and stand therein at the same level as in the recipient, for which purpose the top of the recipient communicates with the top of the cylinder D by a smaller pipe, C². Thus, by observing the level of the sewage matter in the gage, the action of the pump B can be stopped before the liquid matter reaches the suction-tube, whereupon the valve R on the supply-pipe T' is closed.

For further security in preventing the sewage matter from passing into the pump, the suction-pipe B' is divided at R', and there is introduced at that point a perforated diaphragm, R'', as shown to enlarged longitudinal and cross section at Figs. 5 and 6, the holes in the diaphragm being of such a size as, while allowing the free passage of air, to prevent the sewage matter from passing through them.

As the air-pump B in exhausting the recipient T will discharge not only atmospheric air, but also more or less obnoxious vapors emanating from the sewage matter, its discharge-pipe B'' is made to open into the fire-box of the portable engine, so that any such gases will be burned and rendered innocuous in passing through the fire.

It might occur that on account of leakages in the recipient or in the supply and suction pipes B' T', or through these pipes becoming clogged, the sewage matter is prevented from passing properly into the recipient, so that the pump would work uselessly. To prevent this I construct a portion of the supply-tube T' of glass, as shown at Fig. 2, and to an enlarged scale in longitudinal and cross sections at Figs. 9 and 10.

E is a glass tube, fitted at each end air-tight into metal sockets E'' E''', which, in their turn, are fitted air-tight to the flanged ends of the pipe T', the whole being secured together by means of tie-bolts e, passing through the said flanges, as shown at Fig. 2, which bolts at the same time protect the tube E from injury.

By the above means it can always be observed whether the sewage matter is passing into the recipient properly.

The construction of the pump-barrel will be understood on reference to the enlarged longitudinal section thereof at Fig. 3 and the end view at Fig. 4, one of the valve-plates and covers or caps being removed.

B is a cylindrical barrel, in which works a piston of ordinary construction, whose rod passes through the stuffing-box in the one cover, G'. The ends of the cylinder have fitted to them plates K K, in which are openings, having suction-valves I I and discharge-valves I' I'. These valves are by preference metal flap-valves faced with caoutchouc, leather, or the like, and they are kept down on their seats by light springs $p$, coiled round the hinge-pin of the valve, and bearing with a loop, $p''$, upon the valve, while the ends $p'$ bear against the plate K. Over the valve-plates are fitted the hollow covers G G, having cross-ribs G' fitting closely against the plates K, so as to form two separate chambers in each cover, the one communicating with the suction-valves I and the other with the delivery-valves I'. These chambers also communicate, respectively, with two longitudinal passages, $h\ h$, formed through the sides of the cylinder B, which passages have at their middle branches H H, that are connected by means of sockets $i\ i$, respectively, with the suction and delivery pipes B' B''. The covers and valve-plates are all secured air-tight to the ends of the cylinder by means of one set of screw-bolts passing through holes in flanges F on the ends of the cylinder, and through corresponding holes in the covers and valve-plates.

In order to prevent any leakage of the sewage matter past the valve R when the recipient T is filled and is being conveyed to its destination, the pipe T' or mouth of the valve (the pipe being removed) is closed by a cap. (Shown in front view and section at Figs. 7 and 8.) The mouth L' of the valve or pipe has a flange, $l$, the rear face of which is formed with inclines, and the cap L has claws M, that are first passed down grooves in the said flange, and then, by turning the cap by means of the claws M as handles, these are made to bear upon the inclines, a circular rib, $m'$, on the cover being thus made to bear upon a rubber washer on the flange $l$, so as to effect a hermetic closure of the opening.

I do not here claim the construction of the air-pumping cylinder, as such will constitute the subject-matter of a separate application for Letters Patent.

Heretofore apparatus for cleaning cesspools have been constructed of tanks in which a vacuum is created for the purpose of drawing the sewage matter into the tank; but such broadly does not constitute my invention.

An apparatus for cleaning cesspools has also been constructed of an air-pump operated by hand, and having a discharge-pipe leading to a vessel containing deodorizing material, and a pipe leading to the head of a barrel, the head of the barrel being provided with a supply-pipe for communicating with a cesspool or sink, whereby a vacuum can be created in the barrel for the purpose of drawing the sewage matter into the same, the exhausted air passing through the vessel containing the deodorizing substance; but neither does such structure constitute my invention.

Having thus described the nature of my invention and in what manner the same is to be performed, I claim—

1. In an apparatus for removing the contents of cesspools, the combination of a portable engine, and an air-pump having its discharge-pipe arranged to open into the fire-box of the engine, with a portable recipient, a suction-pipe leading from the top portion of the recipient to the air-pump, and a supply-pipe connected with the lower portion of the recipient and adapted to communicate with the cesspool, substantially as and for the purpose described.

2. The combination of the portable air-pump B, the recipient T, the suction-pipe B', connecting the upper portion of the recipient with the air-pump, the supply-pipe T', connected with the lower portion of the recipient, and a gage consisting of a vertical glass cylinder having its lower and upper ends connected, respectively, with the side and top portions of the recipient, all substantially as and for the purposes described.

3. The combination of a portable engine, A, and an air-pump, B, having its delivery-pipe B'' arranged to open into the fire-box of the engine, with a portable recipient, T, a suction-pipe, B', connecting the top portion of the recipient with the air-pump, a supply-pipe, T', connected with the lower portion of the recipient and adapted to communicate with a cesspool, and a gage consisting of the vertical glass cylinder D, and pipes $c'$ and $c^2$, connected, respectively, with the side and top portion of the recipient, all substantially as and for the purposes described.

4. The combination, with a portable air-pump, B, and a portable recipient, T, of a suction-pipe, B', connecting the upper portion of the recipient with the air-pump, and provided intermediate its attached ends with a perforated diaphragm for preventing access of the sewage to the air-pump, substantially as described.

5. The combination, with a portable air-pump, a portable recipient, and a suction-pipe connecting the upper portion of the latter with the pump, of a supply-pipe leading from the lower portion of the recipient, and provided with a glass tube or cylinder, forming a part of said supply-pipe, substantially as and for the purpose described.

In testimony whereof I have signed my name to this specification, in the presence of three subscribing witnesses, this 3d day of February, A. D. 1881.

NICOLAS TALARD.

Witnesses:
JULES CHARLES EUGENE DUPONTE,
JULES HENRI J. DIGEON,
PHILIP WALKER.